United States Patent [19]
Huang et al.

[11] Patent Number: 5,943,805
[45] Date of Patent: Aug. 31, 1999

[54] MULTIPURPOSE BUSINESS CARD ALBUM CAPABLE OF BEING FASTENED WITH AUTOMOBILE SUN VISOR

[76] Inventors: Charlie Huang; Eric Shyu, both of P.O. Box 23-487, Chang-Hua City 500, Taiwan

[21] Appl. No.: 09/184,037

[22] Filed: Nov. 2, 1998

[30] Foreign Application Priority Data

Aug. 25, 1998 [TW] Taiwan ................................ 87213896

[51] Int. Cl.⁶ ...................................................... G09F 1/10
[52] U.S. Cl. ........................... 40/654.01; 40/775; 40/593
[58] Field of Search ................................. 40/654.01, 643, 40/591, 593, 775, 776; 150/135, 147

[56] References Cited

U.S. PATENT DOCUMENTS 1,359,319  11/1920  Brenan ...................... 150/147
4,065,864  1/1978  Stanley ........................ 40/776

Primary Examiner—Cassandra H. Davis

[57] ABSTRACT

A multipurpose business card album is composed of a base plate, a lift plate, and a plurality of fastening devices intended for use in fastening the multipurpose business card album with an automobile sun visor. The base plate is provided with a plurality of pouches and through holes. The lift plate is made integrally with the base plate such that the lift plate can be lifted. The lift plate is also provided with a plurality of pouches. Each of the fastening devices has a support portion, a bracing portion, and a retaining portion which is retained in one of the through holes of the base plate. The multipurpose business card album is fastened with the automobile sun visor by the fastening devices such that the automobile sun visor is sandwiched between the support portion and the bracing portion of each one of the fastening devices.

1 Claim, 6 Drawing Sheets

MULTIPURPOSE BUSINESS CARD ALBUM CAPABLE OF BEING FASTENED WITH AUTOMOBILE SUN VISOR

FIELD OF THE INVENTION

The present invention relates generally to business card album, and more particularly to a multipurpose business card album that can be fastened with an automobile sun visor and used as an organizer.

BACKGROUND OF THE INVENTION

The automobile sun visor is generally provided with an accessory article that is fastened therewith for keeping a variety of small items, such as business card, picture, driver's license, pen, small notebook, pamphlet, etc. In view of the fact that the accessory article of the automobile sun visor is not provided with an organized, these small items are often kept in a disorganized manner. In addition, the accessory article undermines the esthetic effect of the automobile sun visor.

SUMMARY OF THE INVENTION

It is therefore the primary objective of the present invention to provide a multipurpose business card album that can be fastened with an automobile sun visor.

It is another objective of the present invention to provide a multipurpose business card album that can be fastened with an automobile sun visor for keeping a variety of things in an organized manner.

It is further another objective of the present invention to provide a multipurpose business card album which can be fastened with an automobile sun visor in a manner that the esthetic effect of the automobile sun visor is not undermined by the multipurpose business card album.

The objectives, features, functions, and advantages of the present invention will be readily understood upon a thoughtful deliberation of the following detailed description of the present invention with reference to the accompanying drawings.

DETAILED DESCRIPTION OF THE INVENTION

Figure 1:
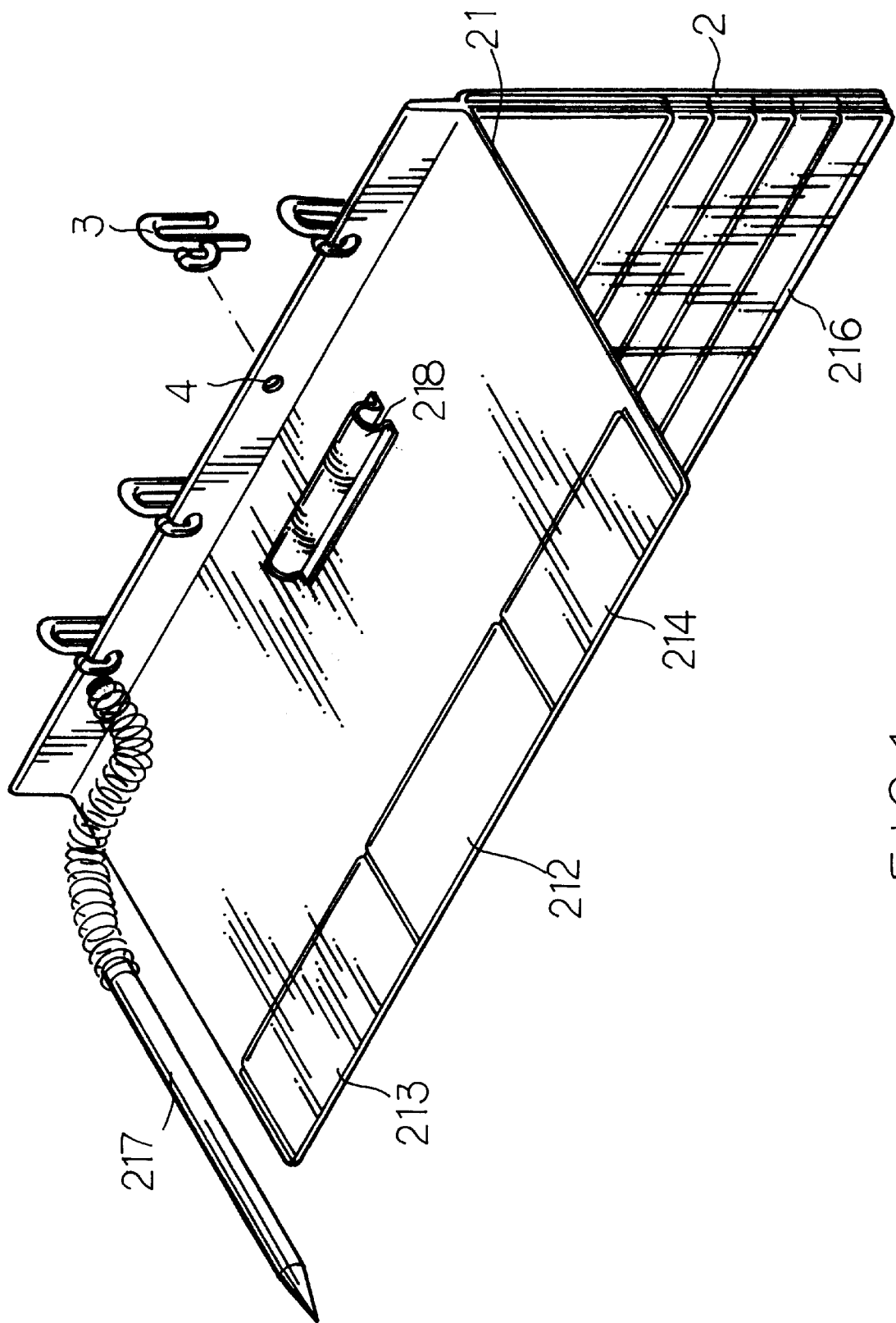
FIG. 1 shows a schematic view of the present invention.
Figure 2:
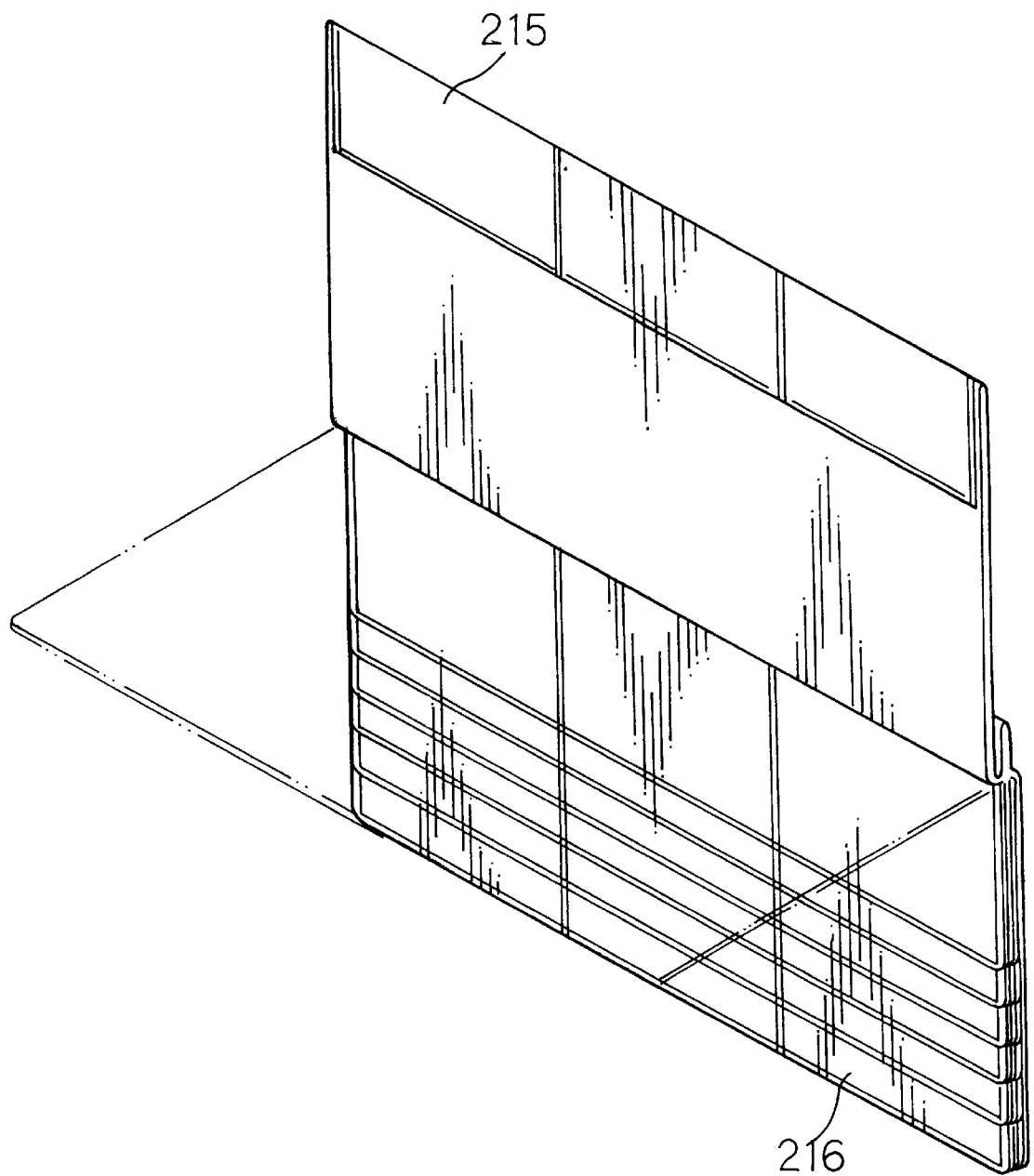
FIG. 2 shows another schematic view of the present invention.
Figure 3:
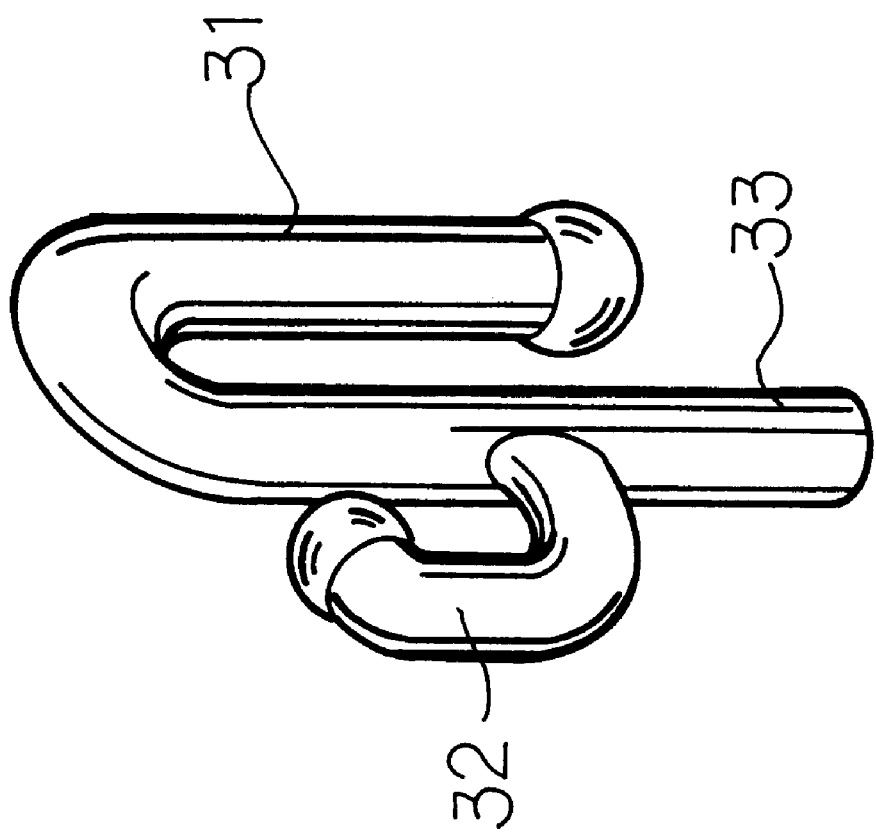
FIG. 3 shows a perspective view of a fastening device of the present invention.
Figure 4:
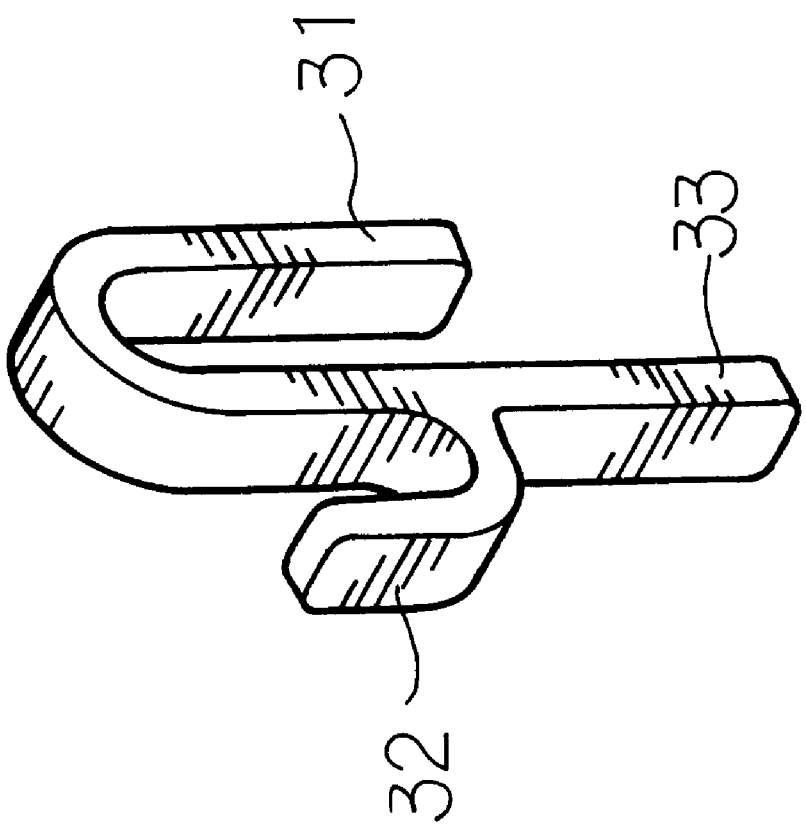
FIG. 4 shows a perspective view of another fastening device of the present invention.

As shown in FIGS. 1–5, a multipurpose business card album embodied in the present invention is composed of a base plate 2 and a lift plate 21 which is made integrally with the base plate 2 and can be lifted. The base plate 2 is provided with a plurality of business card pouches 216 fastened therewith by the hot press method. The lift plate 21 is provided in the upper surface thereof with a calculator pouch 212, a driver's license pouch 213, a paper slip pouch 214, and a pen holder 218 for locating a pen 217 which is fastened at one end thereof with one end of a cord which is in turn fastened at other end thereof with the base plate 2. The lift plate 21 is further provided in the underside thereof with a plurality of pouches 215 for keeping personal items, as shown in FIG. 2.

Figure 5:
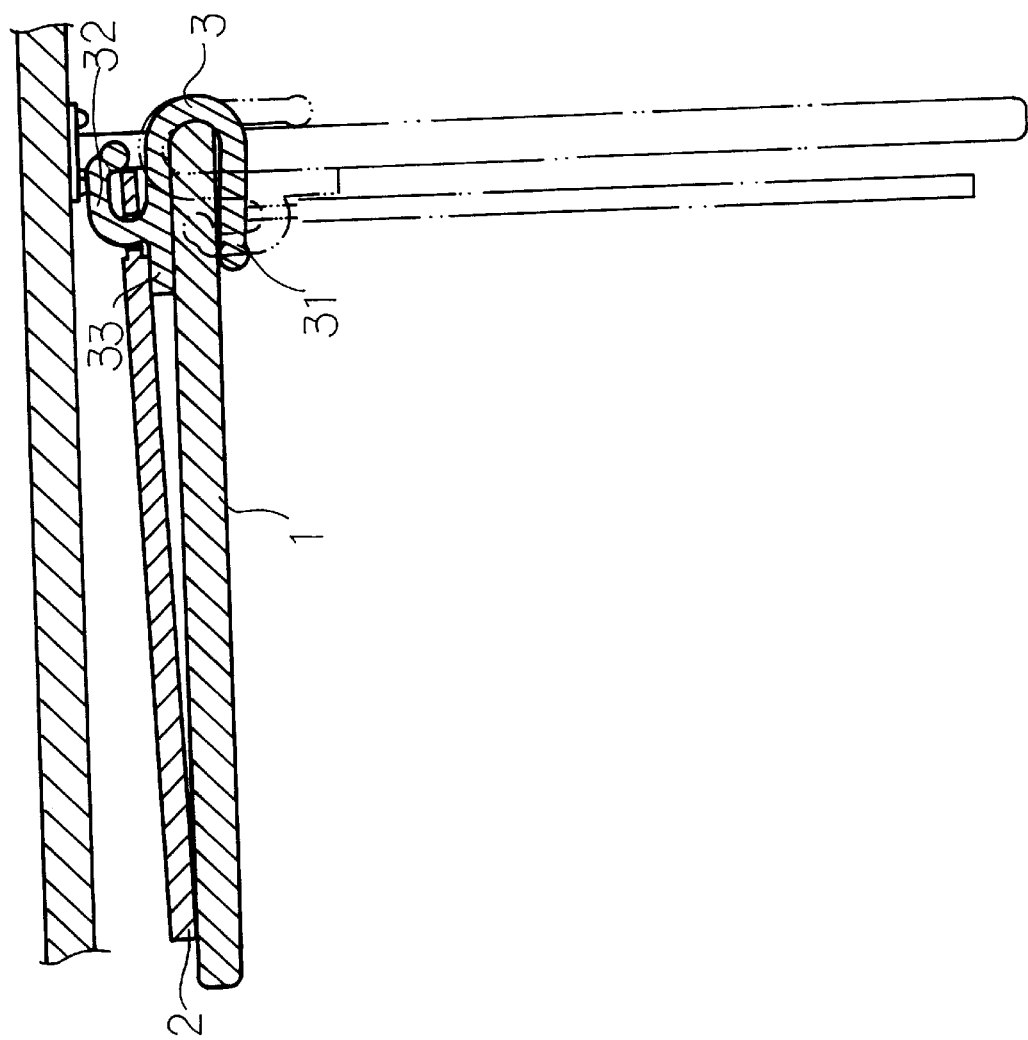
FIG. 5 is a schematic view showing the relationship between an automobile sun visor and the present invention.
Figure 6:
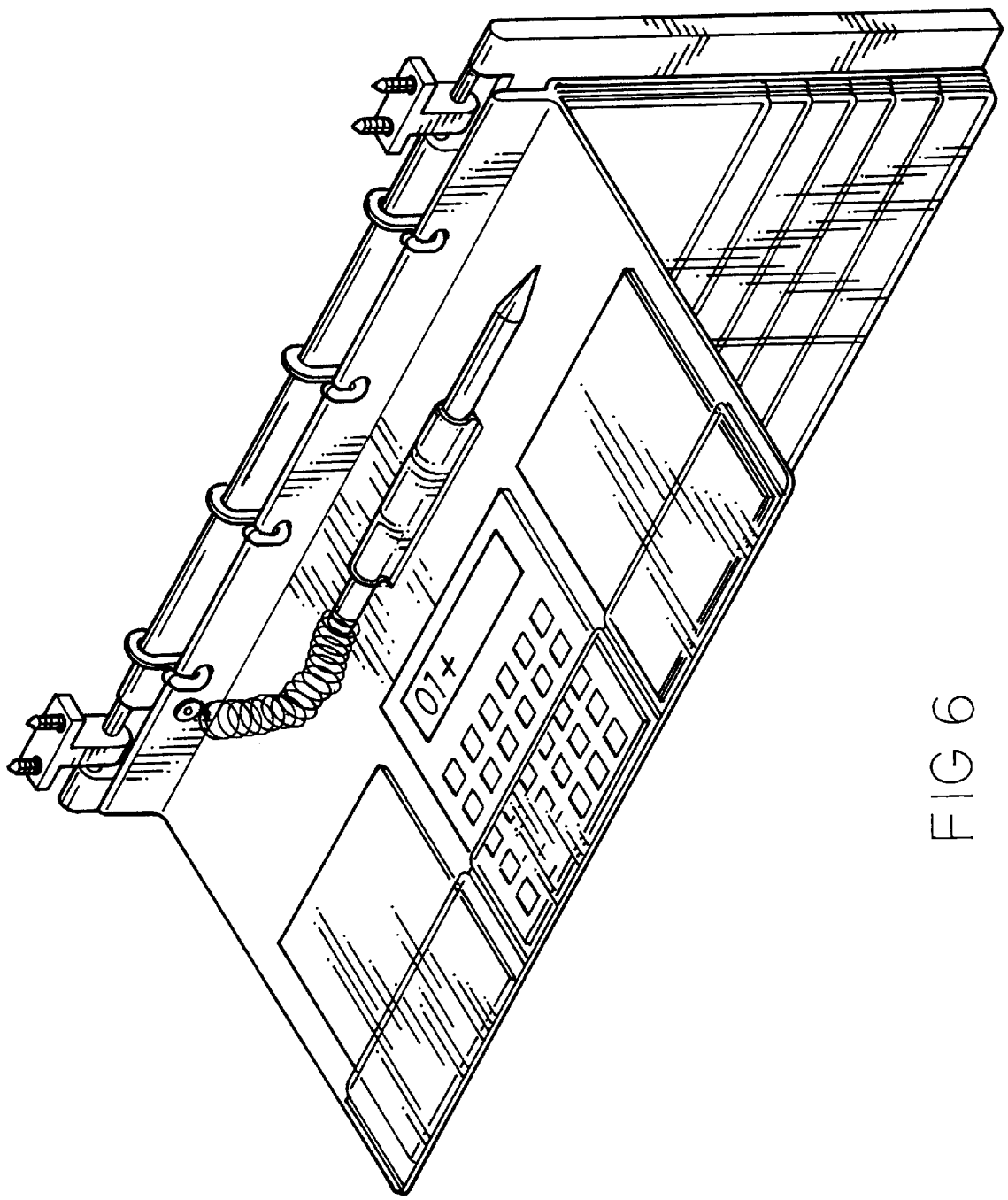
FIG. 6 shows a perspective view of the present invention in use.

The base plate 2 is provided along the upper edge thereof with a plurality of through holes 4 for retaining a plurality of fastening devices 3. Each of the fastening devices 3 has a retaining portion 32, a bracing portion 33, and a support portion 31, which are made integrally. The fastening devices 3 are used to fasten the present invention with an automobile sun visor 1 such that the retaining portions 32 are retained in the through holes 4 of the base plate 2, and that the automobile sun visor 1 is sandwiched between the support portions 31 and the bracing portions 32, as shown in FIG. 5.

It must be noted here that the calculator pouch 212 is transparent so that the calculator kept in the pouch 212 can be operated by touch, without having to take the calculator out of the pouch 212.

It is therefore readily apparent that the present invention can be used to keep a variety of things in an organized manner, and that the present invention can be fastened easily with an automobile sun visor without undermining the esthetic effect of the automobile sun visor.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claim.

What is claimed is:

1. A multipurpose business card album comprising:

a base plate provided in one side thereof with a plurality of business card pouches, and along an upper edge thereof with a plurality of through holes;

a lift plate made integrally with said base plate and provided in an upper surface thereof with a calculator pouch, a driver's license pouch, a paper slip pouch, a pen holder, said lift plate further provided in an underside thereof with a plurality of pouches facing said business card pouches of said base plate; and a plurality of fastening devices corresponding in number to said through holes of said base plate, said fastening devices having a support portion, a bracing portion, and a retaining portion which is retained in one of said through holes of said base plate;

said multipurpose business card album capable of being fastened with an automobile sun visor such that other side of said base plate is rested against one side of the automobile sun visor, and that the automobile sun visor is sandwiched between said support portion and said bracing portion of each of said fastening devices.

* * * * *